United States Patent [19]

Blizzard et al.

[11] Patent Number: 4,465,805

[45] Date of Patent: Aug. 14, 1984

[54] CURABLE MASSES PRODUCING FLUOROSILICONE ELASTOMERS AND COATINGS

[75] Inventors: John D. Blizzard, Bay City; Terence J. Swihart, Essexville, both of Mich.

[73] Assignee: Dow Corning Corporation, Midland, Mich.

[21] Appl. No.: 565,073

[22] Filed: Dec. 23, 1983

[51] Int. Cl.$^3$ ............................................. C08K 5/02
[52] U.S. Cl. ........................... 524/765; 528/15; 528/31; 528/32; 525/478; 427/387; 427/388.1; 427/388.5; 427/391; 427/393; 428/447; 428/450
[58] Field of Search ............ 524/765; 528/15, 31, 528/32; 525/478; 427/387, 388.1, 388.5, 391; 428/447, 450

[56] References Cited

U.S. PATENT DOCUMENTS

| | | | |
|---|---|---|---|
| 3,179,619 | 4/1965 | Brown | 260/37 |
| 4,041,010 | 8/1977 | Jeram | 260/42.26 |
| 4,322,518 | 3/1982 | Blizzard | 528/14 |

*Primary Examiner*—Melvyn I. Marquis
*Attorney, Agent, or Firm*—Andrew H. Ward

[57] ABSTRACT

Hydrocarbon liquid resistant fluorosilicones are disclosed. The fluorosilicones comprise: (A) the reaction product of (i) a certain organosilicon resin consisting essentially of $R_3SiO_{\frac{1}{2}}$ units and $SiO_{4/2}$ units wherein R is a monovalent hydrocarbon radical, and (ii) a polyorganohydrogensiloxane; (B) a fluorosilicone containing vinyl radicals or hydroxyl radicals; and (C) a catalyst.

32 Claims, No Drawings

CURABLE MASSES PRODUCING FLUOROSILICONE ELASTOMERS AND COATINGS

BACKGROUND OF THE INVENTION

The present invention deals with novel curable fluorosilicone masses that are especially useful as elastomers and coatings.

Silicone coatings in general are quite well known. Pertinent to the present invention among silicone coatings are the curable silicone compositions described in U.S. Pat. No. 4,322,518, issued Mar. 30, 1982 to J. Blizzard and assigned to the assignee of the present invention. In said U.S. Patent compositions are disclosed which comprise: (1) certain liquid copolymeric organopolysiloxanes comprising $SiO_{4/2}$ units, silicon-bonded hydroxy radicals, and/or silicon bonded hydrogen radicals, and (2) a polydiorganosiloxane in which the organic radical substituents are monovalent hydrocarbon radicals. Each polydiorganosiloxane molecule cotains at least two vinyl radicals or silicon-bonded hydroxy radicals, on average.

Silicone elastomers and coatings, such as those described in U.S. Pat. No. 4,322,518 have been successful in furnishing beneficial properties. For example, silicone elastomers and coatings have good release of normally adherent materials, low temperature flexibiliity, resistance to degradation at elevated temperatures, and a variety of other beneficial properties. Additionally, silicone elastomers and coatings are easy to fabricate, such as by coating onto a substrate, by extrusion, or by many of the various molding techniques.

Nonetheless, there are certain use environments for elastomers and coatings that require greater resistance to hydrocarbon liquids than is furnished by silicone elastomers and coatings comprising mainly hydrocarbon radical substituents. Examples of some of the more important hydrocarbon liquids include fuels, such as gasoline, kerosene, diesel fuel, light oil and the like; solvents such as naptha, mineral spirits, hexane, pentane, iso-octane, toluene, xylene and the like; edible oils such as corn oil, shortening, peanut oil, olive oil and the like; and other important hydrocarbon liquids.

By resistance to hydrocarbon liquids it is meant herein: maintaining useful mechanical properties and dimensional stability upon prolonged exposure to hydrocarbon liquids. Thus an elastomer that is resistant to hydrocarbon liquids will not substantially swell and will not substantially diminish in, e.g. tensile strength, upon prolonged exposure, such as 30 minutes or more, to hydrocarbon liquids. A hydrocarbon resistant coating so exposed will not dissolve, change substantially in appearance, or swell.

In order to increase the hydrocarbon liquid resistance of silicone elastomers and coatings, various alterations of basic monovalent hydrocarbon-substituted silicone elastomers and coatings have been attempted. One of the more successful of such alterations has been the synthesis and commercial development of silicones substituted with fluorinated hydrocarbons; such silicones are referred to herein as fluorosilicones.

Exemplary of fluorosilicone compositions curable to elastomers is the composition disclosed in U.S. Pat. No. 3,179,619, issued Apr. 20, 1965. Said composition comprises a polydiorganosiloxane polymer containing a high proportion of fluorinated radicals, filler, organic peroxide, and other components. Upon cure, said composition yields elastomers of good mechanical strength. Unfortunately, because of the extremely high viscosity of said composition, application as a thin film, such as 0.025 mm or less in thickness, is difficult, if not impossible.

U.S. Pat. No. 4,041,010 issued Aug. 9, 1977, discloses a two part, room temperature curing fluorosilicone comprising: a vinyl group terminated fluorosilicone polymer; a vinyl-containing polymer or resin; a hydrogen-containing fluorosilicone; and a platinum catalyst.

U.S. Pat. No. 3,050,411, issued Aug. 21, 1962, discloses release coatings consisting essentially of methylhydrogenpolysiloxane, plus a polydiorganosiloane containing fluoroalkyl groups. While excellent release properties and suitable resistance to hydrocarbon solvents are furnished by the coatings of U.S. Pat. No. 3,050,411, said coatings are lacking in the strength furnished by filled, high viscosity fluorosilicone elastomers.

Thus it would be desirable to provide a fluorosilicone composition that is resistant to hydrocarbon liquids, has good strength, and can be conveniently applied to a substrate as a thin film.

SUMMARY OF THE INVENTION

It is an object of the present invention to provide a mass curable to a strong fluorosilicone elastomer. It is a further object to provide such a mass at a viscosity such that said curable mass can be readily applied as a thin film upon a substrate. Another object is to provide a mass curable to a strong, hydrocarbon liquid resistant elastomer. It is a further object to provide a solventless mass curable to a hydrocarbon resistant elastomer or hydrocarbon resistant coating.

These objects are accomplished by the compositions of the present invention and their cured products. Other objects will become clear upon reading this specification.

In the present invention, there are combined: (A) a certain liquid copolymeric polysiloxane; (B) a polydiorganosiloxane containing fluorinated alkyl radical substituents; and (C) a catalyst.

DETAILED DESCRIPTION OF THE INVENTION

The present invention relates to a curable mass comprising the combination of:
(A) the reaction product of
  (i) an organosilicon resin consisting essentially of $R_3SiO_{\frac{1}{2}}$ units and $SiO_{4/2}$ units, wherein R represents a monovalent hydrocarbon radical, and the ratio of $R_3SiO_{\frac{1}{2}}$ units to $SiO_{4/2}$ units is from 0.6/1 to 0.9/1, and
  (ii) a polydiorganosiloxane having the formula

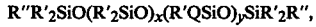
  $$R''R'_2SiO(R'_2SiO)_x(R'QSiO)_ySiR'_2R'',$$

wherein
  Q represents a radical having the formula

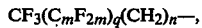
  $$CF_3(C_mF_{2m})_q(CH_2)_n—,$$

m, n, and q each having a value of from 0 to 5 inclusive,
  R' represents a monovalent hydrocarbon radical,
  R'' is selected from the group consisting of vinyl radicals and hydroxyl radicals, there being at least one radical per molecule selected from the group consisting of vinyl radicals and hydroxyl radicals, x has a value of from 0 to 7000, y has a value of from 2 to 5000; and (C) a catalytically effective amount of a catalyst.

In other aspects, the present invention relates to elastomers and coatings resulting from curing the curable masses of the present invention.

Component (A) of the curable mass of the present invention is the reaction product of: (i) an organosilicon resin consisting essentially of $R_3SiO_{\frac{1}{2}}$ units and $SiO_{4/2}$ units, wherein R is a monovalent hydrocarbon radical and the ratio of $R_3SiO_{\frac{1}{2}}$ units to $SiO_{4/2}$ unit is from 0.6/1 to 0.9/1; and (ii) a polyorganohydrogensiloxane.

Component (A) of the curable mass of the present invention is disclosed in U.S. Pat. No. 4,310,678, issued Jan. 12, 1982 to Blizzard and Swihart and assigned to the assignee of the present invention. The specification of U.S. Pat. No. 4,301,678 is hereby incorporated into the present specification by reference to describe component (A) of the present invention and to teach methods of synthesizing said component (A).

Briefly stated, component (A) can be synthesized by reacting together:

(i) an organosilicone resin consisting essentially of $R_3SiO_{\frac{1}{2}}$ units and $SiO_{4/2}$ units in the ratio stated above; and (ii) a polyorganohydrogensiloxane.

R in reactant (i) represents a monovalent hydrocarbon radical, that is, a monovalent radical composed of hydrogen atoms and carbon atoms. R can thus be an alkyl radical, such as methyl, ethyl, butyl, propyl and the like; an alkenyl or cycloalkenyl radical, such as vinyl, allyl, cyclopentenyl and the like; an aryl radical, such as phenyl, tolyl, xylyl and the like; an arylalkyl radical, such as beta-phenylethyl, beta-phenylpropyl and the like; or a cycloaliphatic radical, such as cyclohexyl, cyclopentyl, cycloheptyl and the like. Preferably R is a lower alkyl radical, such as methyl, ethyl, or propyl. Most preferably, R is a methyl radical. Minor amounts of vinyl radicals as R radicals are beneficial to enhance reactivity in some cases. Reactant (i) contains from 0.1% to 5% by weight, based on the total weight of reactant (i), of hydroxyl radicals bonded to silicon atoms. Minor proportions of alkoxy radicals are often unintentionally present in organosilicon resins. The presence of alkoxy radicals in reactant (i) is not thought to have any effect on the ultimate curable masses.

Preferably, reactant (i) is comprised of 1 to 5 percent by weight of silicon-bonded hydroxyl radicals, based on the total weight of reactant (i).

For the purpose of making component (A), reactant (i) is furnished dispersed in an organic solvent. The particular identity of the organic solvent is not critical, although it is advantageous to select an organic solvent which forms an azeotrope with water. Such organic solvents are well known for this purpose, and include, for example, benzene, toluene, xylene, and trichloroethane.

Organosilicon resins useful as reactant (i) are well known. Said resins, and their synthesis, are described in U.S. Pat. No. 2,676,182, issued Apr. 20, 1954, which patent is incorporated herein by reference to teach a method of synthesis for reactant (i).

To summarize a preferred method of synthesis of reactant (i), the following steps are performed:

1. An aqueous solution of sodium silicate is acidified to a pH value of less than about 5;

2. The resulting mixture is treated with a source of $R_3SiO_{\frac{1}{2}}$ units;

3. The mixture from step 2 is heated, then cooled;

4. The product of step 3 is fractionally extracted with an appropriate, water-immiscible organic solvent. An organosilicon resin suitable for use as reactant (i) will then be isolated in the organic solvent fraction.

Sources of $R_3SiO_{\frac{1}{2}}$ units include compounds having the general formula $R_3SiX$, wherein X is a hydrolyzable radical, such as a halogen radical, or alkoxy radical; a disiloxane of the general formula $(R_3Si)_2O$; or other sources of $R_3SiO_{178}$ units known to those skilled in the art.

Preferably, the extraction in step 4 above is carried out in such a manner that from 0.0018 to 0.018 equivalents of acid per gram of reactant (i) remain in the solvent/reactant (i) fraction.

Reactant (ii) of component (A) of the curable masses of the present invention is a polyorganohydrogensiloxane, as described in U.S. Pat. No. 4,322,518. By polyorganohydrogensiloxane it is meant herein a liquid polyorganosiloxane containing an average of at least one silicon-bonded H radical per molecule.

Reactant (ii) can have a linear, cyclic, or branched polymeric structure, or appropriate combinations of these structures, provided that said reactant (ii) is a liquid. Radicals of reactant (ii) that are not silicon-bonded hydrogen radicals are selected from monovalent hydrocarbon radicals as hereinabove described. A linear polyorganohydrogen siloxane consisting essentially of $(CH_3)(H)SiO$ units, and having a degree of polymerization of from 25 to 75 repeat units is a preferred reactant (ii).

Polyorganohydrogensiloxanes suitable for use as reactant (ii) are well known; many are available commercially. Said polyorganohydrogensiloxanes need not be further detailed herein.

Preferably, reactant (i) and reactant (ii) can be reacted together to form component (A) in the following manner:

Reactant (i), dispersed in organic solvent, is first thoroughly mixed with reactant (ii). The resultant mixture is heated to volatilize and remove the organic solvent from the mixture. Said heating is preferably done in two stages. In a first stage, heating and removal of some of the organic solvent is accomplished at ambient pressure. In a second stage heating and solvent removal are continued at reduced pressure. The second stage is preferably continued until the organic solvent has been substantially removed.

By substantially removed it is meant herein that the concentration of organic solvent is less than 1% by weight, based on the total weight of the mixture.

If reactant (i), as furnished, does not contain from 0.0018 to 0.018 equivalents of acid per gram, it is necessary to add the appropriate amount of a strong acid, such as HCl, to the reaction mixture.

The relative amounts of reactant (i) and reactant (ii) that are used are not overly critical. Generally, from 10 to 90 parts by weight of reactant (i) are reacted with 90 to 10 parts by weight of reactant (ii). More preferably, roughly equal parts by weight of reactants (i) and (ii) are used, such as 40 to 60 parts by weight of reactant (i) and 60 to 40 parts by weight of reactant (ii), all of the above parts based on 100 total parts by weight of component (A).

Component (B) of the curable masses of the present invention has the formula:

$$R''R'_2SiO(R'_2SiO)_x(QR'SiO)_ySiR'_2R''.$$

Q in the above formula for component (B) represents the $CF_3(C_mF_{2m})_q(CH_2)_n$— radical, wherein m, n and q each has an integer value of from 0 to 5 inclusive.

R' in said formula represents a monovalent hydrocarbon radical as described hereinabove for reactant (i) of component (A).

R'' in said above formula is selected from the group consisting of R' radicals, Q radicals, vinyl radicals, and hydroxyl radicals. Polydiorganosiloxane component (B) must contain, on average, at least one vinyl radical or hydroxyl radical per molecule.

The value of x in the above formula for polydiorganosiloxane component (B) is from 0 to 7000, and the value of y in the above formula is from 2 to 5000. Thus, polydiorganosiloxane component (B) can range in viscosity from a pourable liquid to a highly viscous gum having a viscosity of 25,000,000 centipoise or more.

In a more preferred embodiment of the curable masses of the present invention, Q in the above formula represents the $CF_3CH_2CH_2$— radical, R' represents the $CH_3$— radical, R'' represents the hydroxyl radical, x has a value of from 0 to 20, and y has a value of from 200 to 1600. This preferred range of values for x and y results in a range of viscosity from approximately 1000 centipoise to 40,000 centipoise, when the substituents are the preferred radicals recited above.

Polydiorganosiloxanes as herein described for component (B) are well known; many are commercially available. Alternatively, said polydiorganosiloxanes can be synthesized by well known methods of synthesizing fluorosilicones, such as basic polymerization of appropriate cyclotrisiloxanes.

Briefly, suitable fluoroalkyl substituted polydiorganosiloxanes can be synthesized as follows:

Cyclotrisiloxanes, such as

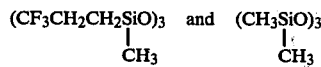

are mixed together in appropriate proportions. A basic catalyst is then added to the resulting mixture, and external heating is applied to effect polymerization. Hydroxyl endgroups can be incorporated by adding water to the reaction mixture after the polymerization reaction has been substantially completed. Vinyl endgroups can be provided by adding vinyl containing endblockers to the reaction mixture after the polymerization reaction has been substantially completed. Examples of suitable vinyl containing endblockers are

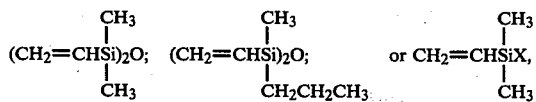

wherein X is a hydrolyzable group as hereinabove described in the description of reactant (i) of component (A) of the curable masses of the present invention. Other suitable vinyl containing endblockers will be familiar to those skilled in the art.

Component (C) of the curable masses of the present invention is selected from the group consisting of hydrosilylation catalysts, silanol condensation catalysts and basic catalysts.

Hydrosilylation catalysts, that is catalysts for the general reaction $SiH+CH_2=CH-\rightarrow SiCH_2CH_2-$, are well known. Examples of hydrosilylation catalysts are complexes and salts of certain metals, such as Pt, Pd, Ni, Ru, Rh, Cu, Os, and Ir. Preferred hydrosilylation catalysts for use as component (C) are salts and complexes of said metals that are soluble in component (B) of the curable masses of the present invention. Especially preferred are complexes of Pt that are soluble in component (B), such as the complex formed by the addition of chloroplatinic acid to tetramethyldivinyldisiloxane.

Silanol condensation catalysts, that is, catalysts for the general reaction $\equiv SiOH+HOSi\equiv \rightarrow \equiv SiOSi\equiv +H_2O$, are also well known. Silanol condensation catalysts include the amine and carboxylic acid salts of Pb, Zn, Zr, Sb, Fe, Cd, Sn, Ba, Ca, and Mn. Preferred silanol condensation catalysts are salts that are soluble in component (B). Especially preferred are the carboxylic acid salts of Sn, such as stannous octoate.

Basic catalysts that are useful as component (C) of the curable masses of the present invention include $NH_3$, alkali metal hydroxides, such as KOH, NaOH, and the like.

The relative amounts of component (A) and (B) that are to be used in the curable masses of the present invention are not narrowly critical. Said relative amounts can be varied widely, thus producing a variety of curable masses. Thus, from 10 parts to 90 parts by weight of component (A) and from 90 to 10 parts by weight of component (B) can be combined to form useful curable masses. More preferably, from 40 to 60 parts by weight of component (A) and from 60 to 40 parts by weight of component (B) are combined, all of the above parts by weight being based on 100 total parts by weight of component (A), plus component (B).

Component (C) is present in the compositions of the present invention in a catalytically effective amount. By catalytically effective amount it is meant herein an amount sufficient to allow cure of a mixture component (A) and Component (B) in a reasonable amount of time, such as one hour or less, at a reasonably elevated temperature, such as from 50° C. to 250° C. By cure it is meant herein that the elastomer or coating that has been cured is not soluble in a solvent that dissolves the not-yet-cured composition. Exemplary of such solvents are aromatic hydrocarbon solvents, such as benzene, toluene, or xylene. Thus an uncured elastomer will swell and dissolve within an hour in such a solvent. An uncured coating will swell, dissolve, and/or smear on a substrate.

Determination of a catalytically effective amount of a given catalyst is a matter for routine experimentation, and can vary quite widely. Generally, from 0.001% to about 1% by weight, based on the total weight of the curable mass, can be taken as a reasonable range for catalytically effective amounts.

As a particular example, approximately 0.007% by weight of Pt as the metal has been found to be an effective amount of a hydrosilylation catalyst in one case.

Cure times that are sufficient to cure the curable masses of the present invention can range from a few seconds to several hours at temperatures of from 50° C. to 250° C. Sufficient cure times for a given curable mass can be varied by varying the relative amount of component (C), and/or varying the temperature. In general, the minimum sufficient cure time is inversely proportional to the cure temperature and inversely proportional to the concentration of component (C).

The curable masses of the present invention are prepared by mixing together the desired amounts of components (A), (B) and (C) until a simple mixture is obtained. By simple mixture it is meant herein a mixture containing no visual discontinuity.

Equipment suitable to obtain a simple mixture from components (A), (B), and (C) is readily available and well known. For curable masses wherein component (B) is a relatively low viscosity liquid, such as 5 to 1000 centipoise, such well known equipment as mechanical stirrers, paddle stirrers and the like will suffice to produce a simple mixture. If the desired composition comprises a higher viscosity component (B), such as a component (B) having a viscosity of from 1000 to 100,000 centipoise, such equipment as three roll mills, sigmoid-blade mixers, bread dough mixers and the like will also suffice to produce a simple mixture. In the event that component (B) has a viscosity in excess of 100,000 centipoise, such equipment as two roll mills, Baker Perkins ® mixers and the like will suffice to produce a simple mixture of components (A), (B), and (C).

While the mixing together of components (A), (B), and (C) can be accomplished by simply supplying the desired quantities of the three components to suitable mixing equipment, it will be advantageous in some cases to supply the mixture in two parts. As a first part, a mixture of components (B) and (C) can be supplied. As a second part, component (A) can be supplied. The two parts can then be mixed just prior to curing. The provision of curable masses in two or more separate parts which are mixed just prior to use is a well known practice. The advantage of such a practice is that shelf life is maximized.

The curable masses of the present invention can contain other, optional ingredients. Exemplary of such optional ingredients are: fillers, such as extending fillers or reinforcing fillers; organic dyes; pigments; bacteriostats and bactericides; fungistats and fungicides; cure control agents; organic solvents; and other optional ingredients.

Specific cure control agents that are contemplated are organosilicon oligomers containing unsaturated groups, and hydrosilylation inhibitors.

Examples of organosilicon oligomer cure control agents are low molecular weight methylvinylsiloxanes, copolymeric oligomers comprising methylvinylsiloxy units and dimethylsiloxy units, methylallyl siloxanes, methylvinylcyclosiloxanes, and the like.

Hydrosilylation inhibitors are organic compounds which are known to inhibit the hydrosilylation reaction, and which volatilize upon application of heat. Exemplary of hydrosilylation inhibitors are certain volatile compounds containing a carbon-carbon triple bond, such as methylbutynol, and various other acetylene derivatives.

Organic solvents can be added to the curable masses of the present invention to lower the viscosity of said curable masses. Examples of suitable organic solvents include, but are not limited to, aliphatic hydrocarbons, such as pentane, hexane, cyclohexane, heptane, isooctane and the like; aromatic hydrocarbons such as benzene, toluene, xylene, mesitylene and the like; and commercial solvent mixtures, such as neutral mineral spirits, naptha and the like. Other suitable organic solvents will be apparent to those skilled in the art.

The organic solvent can be present in amounts from 0 to 99% by weight, based on the total weight of components (A), (B), (C), and organic solvent. More preferably, if a solvent is used, the organic solvent is present from 30% to 70% by weight on the above basis. Most preferably, if a solvent is used, the organic solvent is present from 40% to 60% by weight on the above basis.

Advantageously, the curable masses of the present invention can be used without solvent. Such use without solvent is preferred.

Examples of reinforcing fillers include silica, such as fume or precipitated silica that is untreated, or fume of precipitated silica that has been treated. Examples of extending fillers include ground quartz, aluminum oxide, magnesium oxide, calcium carbonate, and other well known extending fillers.

It is to be understood that the amounts of components (A), (B), and (C) recited herein are to be taken as exclusive of any such other, optional ingredients.

Exemplary of a curable mass incorporating optional ingredients is:

| | |
|---|---|
| Component (A): | 40 to 60 parts by weight; |
| Component (B): | 40 to 60 parts by weight; |
| Component (C): | 0.005 to 0.010 parts, by weight of Pt, furnished as a compound of Pt; |
| methylbutynol: | 0 to 2 parts by weight; |
| methylvinylcyclosiloxanes: | 0 to 2 parts by weight; |
| the total parts by weight of components (A) plus (B) equalling 100 parts. | |

Curable masses of the present invention comprising a relatively low molecular weight, and thus low viscosity, component (B), are especially useful as thin coatings (e.g. from about 0.0025 mm to about 0.050 mm in thickness). Curable masses of the present invention comprising a relatively high molecular weight component (B) are useful as thicker coatings (e.g. from 0.025 mm to 0.500 mm thick).

Examples of substrates upon which the curable masses of the present invention can be coated include, but are not limited to: cellulosic substrates, such as paper or wood; mineral substrates, such as glass, stone, concrete and cement; metal and metal alloy substrates, such as aluminum, steel, silicon, magnesium, copper, brass and bronze; rubber substrates, such as natural rubber, SBR, silicone rubber and butyl rubber; proteinaceous substrates, such as wool, human skin, human hair, feathers, fur and the like; and plastics such as polyolefins such as polyethylene, polypropylene, and polymethylpentene; polyimides; polyamides, such as various well known nylon compositions; and polyesters such as polyethylene terephthalate and polybutylene terephthalate.

Suitable coating techniques are flow coating, dip coating, roller coating, kiss coating, spray coating, manual brushing, and other known coating techniques.

It is believed that those curable masses of the present invention wherein component (B) has a relatively high viscosity can also be fabricated per se into articles of manufacture by such techniques as transfer molding, compression molding, injection molding, or extrusion.

Examples of specific applications in which the curable masses of the present invention are believed to be useful as a coating material include, but are not limited to: release paper, oil resistant gasket coatings, protective coatings for metallic apparatus or metallic components, protective coatings for electrical and electronic components, coatings to facilitate the bonding of dissimilar substrates to form laminates, abrasion and oil resistant coatings for rubber, such as silicone rubber, and other applications. The above list of specific uses is presented solely for illustrative purposes, and is not to be construed as limiting the scope of applications for the curable masses of the present invention.

The following examples are here presented to further illustrate the present invention. These examples are not to be construed as imposing limits on the present invention. All parts and percentages in the examples are by weight unless otherwise specified.

The symbol Me denotes the methyl radical in the following examples.

EXAMPLE 1

A mixture was charged to a vessel provided with a stirrer, said mixture consisting of: (i) 41.2 parts of a polymer having the average formula $$Me_3SiO(MeHSiO)_{35}SiMe_3;$$

(ii) 41.2 parts of an organosilicon resin composed of $Me_3SiO_{1/2}$ units and $SiO_{4/2}$ units in the ratio of 0.6 $Me_3SiO_{1/2}$ units to 1 $SiO_{4/2}$ unit; and 17.6 parts of xylene. This mixture, with continuous stirring, was heated to a temperature of 150° C. The pressure in the vessel was gradually reduced to a value between 40 mm and 50 mm Hg. Heating under reduced pressure was continued for approximately 2 hours. During this time, volatilized xylene was removed and condensed in a reservoir separate from the vessel containing the mixture. After 2 hours, the reaction product was recovered. It was a substantially solvent free liquid organosilicon resin as described hereinabove as component (A) of the curable mass of the present invention.

Fifty parts of the above component (A) were homogeneously mixed with:

50 parts of a polymer having the average formula:

$$\underset{\underset{CH_2CH_2CF_3}{|}}{HO(MeSiO)_{1570}H}$$

(component B);

0.25 parts of 3-methyl,1-butyn,3-ol;

0.75 parts of a mixture of methylvinylcyclosiloxanes having an average degree of polymerization of approximately 5; and 1.0 parts of a Pt complex formed by the reaction of chloroplatinic acid with tetramethyldivinyldisiloxane, said complex comprising 0.7% by weight Pt.

Upon simple stirring, the above mixture formed a cloudy but homogeneous mass.

Said homogeneous mass was coated as a thin film upon an aluminum panel. The coated panel was placed in an air circulating oven, set at a temperature of 150° C., for a period of time of 5 minutes, after which time the coated panel was removed from the oven and allowed to come to room temperature.

The coated panel was then examined. The coating was found to be rubbery. A drop of each of the following substances was placed directly upon the coating, and each drop was allowed to remain upon the coating for 60 minutes. At the end of this 60 minute exposure, the coating was examined, and the following observations were made and recorded:

| Substance | Observation |
| --- | --- |
| xylene | no change in the coating |
| water | no change in the coating |
| toluene | no change in the coating |
| acetone | very slight swell in the coating |
| light oil | no change in the coating |

EXAMPLE 2

Example 1 was duplicated in each respect, except that 50 parts of a polymer having the following average formula were used as component (B):

$$\underset{\underset{CH_2CH_2CF_3}{|}}{HO(MeSiO)_{410}H}$$

The resulting cured coating was examined, and observed to be semi-cheesy. The results upon 60 minute exposure to the following substances were as follows:

| Substance | Observation |
| --- | --- |
| xylene | no change in the coating |
| water | no change in the coating |
| toluene | no change in the coating |
| acetone | some swell in the coating |
| light oil | no change in the coating |

That which is claimed is:
1. A curable mass comprising the combination of:
(A) the reaction product of
  (i) an organosilicon resin consisting essentially of $R_3SiO_{\frac{1}{2}}$ units and $SiO_{4/2}$ units, wherein R represents a monovalent hydrocarbon radical, and the ratio of $R_3SiO_{\frac{1}{2}}$ units to $SiO_{4/2}$ units is from 0.6/1 to 0.9/1, and
  (ii) a polyorganohydrogensiloxane;
(B) a polydiorganosiloxane having the formula $$R''R'_2SiO(R'_2SiO)_x(R'QSiO)_ySiR'_2R'',$$

wherein
Q represents a radical having the formula $$CF_3(C_mF_{2m})_q(CH_2)_n—,$$

m, n, and q each having a value of from 0 to 5 inclusive,
R' represents a monovalent hydrocarbon radical,
R" is selected from the group consisting of R' radicals, Q radicals, vinyl radicals and hydroxyl radicals, there being at least one radical per molecule selected from the group consisting of vinyl radicals and hydroxyl radicals,
x has a value of from 0 to 7000,
y has a value of from 2 to 5000; and
(C) a catalytically effective amount of a catalyst.
2. A curable mass as claimed in claim 1, wherein n has a value of 2.
3. A curable mass as claimed in claim 2, wherein R is a methyl radical.
4. A curable mass as claimed in claim 3, wherein component (A) comprises 10 to 90 parts by weight, based on 100 total parts of component (A) plus component (B).

5. A curable mass as claimed in claim 4, wherein component (A) comprises from 40 to 60 parts by weight, based on 100 total parts of component (A) plus component (B).

6. A curable mass as claimed in claim 3 wherein R' is a methyl radical.

7. A curable mass as claimed in claim 6 wherein component (A) comprises 10 to 90 parts by weight, based on 100 total parts of component (A) plus component (B).

8. A curable mass as claimed in claim 7, wherein component (A) comprises from 40 to 60 parts by weight, based on 100 total parts of component (A) plus component (B).

9. A curable mass as claimed in claim 6 wherein each R" is a hydroxyl radical.

10. A curable mass as claimed in claim 9 wherein component (A) comprises 10 to 90 parts by weight, based on 100 total parts of component (A) plus component (B).

11. A curable mass as claimed in claim 10 wherein component (A) comprises 40 to 60 parts by weight, based on 100 total parts by weight of component (A) plus component (B).

12. A curable mass as claimed in claim 6 wherein R" is a vinyl radical.

13. A curable mass as claimed in claim 12 wherein component (A) comprises 10 to 90 parts by weight, based on 100 total parts of component (A) plus component (B).

14. A curable mass as claimed in claim 13 wherein component (A) comprises 40 to 60 parts by weight, based on 100 total parts of component (A) plus component (B).

15. A curable mass as claimed in claim 2 wherein component (C) is a hydrosilylation catalyst.

16. A curable mass as claimed in claim 15 wherein the hydrosilylation catalyst is a platinum compound.

17. A curable mass as claimed in claim 2 wherein component (C) is a silanol condensation catalyst.

18. A curable mass as claimed in claim 17 wherein the silanol condensation catalyst is a tin compound.

19. A curable mass as claimed in claim 18 wherein x has a value of from 0 to 20 and y has a value of from 200 to 1600.

20. A curable mass as claimed in claim 2 comprising:
40 to 60 parts by weight of component (A);
40 to 60 parts by weight of component (B);
0.005 to 0.10 parts by weight of platinum, furnished as a compound of platinum;
0 to 2 parts by weight of methylbutynol; and
0 to 2 parts by weight of methylvinylcyclosiloxanes.

21. An elastomer resulting from the application of heat to the curable mass of claim 2.

22. An elastomer resulting from the application of heat to the curable mass of claim 11.

23. An elastomer resulting from the application of heat to the curable mass of claim 14.

24. An elastomer resulting from the application of heat to the curable mass of claim 16.

25. An elastomer resulting from the application of heat to the curable mass of claim 18.

26. An elastomer resulting from the application of heat to the curable mass of claim 20.

27. An article comprising a substrate coated with the elastomer of claim 21.

28. An article comprising a substrate coated with the elastomer of claim 22.

29. An article comprising a substrate coated with the elastomer of claim 23.

30. An article comprising a substrate coated with the elastomer of claim 24.

31. An article comprising a substrate coated with the elastomer of claim 25.

32. An article comprising a substrate coated with the elastomer of claim 26.

* * * * *

UNITED STATES PATENT AND TRADEMARK OFFICE
CERTIFICATE OF CORRECTION

PATENT NO. : 4,465,805
DATED : August 14, 1984
INVENTOR(S) : John D. Blizzard, Terence J. Swihart It is certified that error appears in the above-identified patent and that said Letters Patent is hereby corrected as shown below:

In column 4, line 12, "$R_3SiO_{178}$" should read -- $R_3SiO_{\frac{1}{2}}$ --.

In column 5, line 60, "$(CH_2=CH\underset{\underset{CH_2CH_2CH_3}{|}}{\overset{\overset{CH_3}{|}}{Si}})_2O;$" should read -- $(CH_2=CH\underset{\underset{CH_2CH_2CF_3}{|}}{\overset{\overset{CH_3}{|}}{Si}})_2O;$ --.

In column 9, lines 25-26, "$Me_3SiO_{178}$" should read -- $Me_3SiO_{\frac{1}{2}}$ --.

Signed and Sealed this

Nineteenth Day of March 1985

[SEAL]

Attest:

DONALD J. QUIGG

Attesting Officer    Acting Commissioner of Patents and Trademarks